United States Patent [19]
Freudendahl

[11] 3,837,520
[45] Sept. 24, 1974

[54] CONTAINER, ESPECIALLY FOR AGRICULTURAL PRODUCTS

[75] Inventor: Jan Freudendahl, Lyngby, Denmark

[73] Assignee: Jens Axel Freudendahl, Sonderborg, Denmark

[22] Filed: Mar. 6, 1973

[21] Appl. No.: 338,718

[30] Foreign Application Priority Data
Mar. 7, 1972  Denmark .......................... 1048/72

[52] U.S. Cl...................... 220/1.5, 108/58, 220/66
[51] Int. Cl............................................ B65d 89/08
[58] Field of Search........... 220/1 R, 1.5, 4, 5 R, 46, 220/66–70, 55 D, 55 AN, DIG. 11, DIG. 14; 108/51, 52, 58; 214/621

[56] References Cited
UNITED STATES PATENTS

| | | | |
|---|---|---|---|
| 2,648,428 | 8/1953 | White et al. | 220/69 X |
| 2,714,469 | 8/1955 | Carlson | 220/55 AN |
| 3,107,838 | 10/1963 | Brys et al. | 220/67 X |
| 3,162,331 | 12/1964 | Hutchins et al. | 220/1.5 X |
| 3,339,793 | 9/1967 | Gerlovich | 220/66 |
| 3,341,059 | 9/1967 | Schild et al. | 220/67 |
| 3,424,340 | 1/1969 | Rocher | 220/55 HN |
| 3,521,777 | 7/1970 | Vik | 108/58 X |
| 3,797,691 | 3/1974 | Williams | 220/1.5 |

*Primary Examiner*—Donald E. Watkins
*Attorney, Agent, or Firm*—Ladas, Parry, Von Gehr, Goldsmith, & Deschamps

[57] ABSTRACT

The invention consists in a container which is built up of a tube which is open in both ends and bottom end cover means which close the tube air-tightly and constitutes foot means for the container, the top end of the tube being air-tightly closed by top cover means. The bottom cover means are adapted to engage fork-shaped lifting means on a fork lift truck. The container is very cheap to manufacture and has a low weight. The container is easy to detach and to stow away.

5 Claims, 3 Drawing Figures

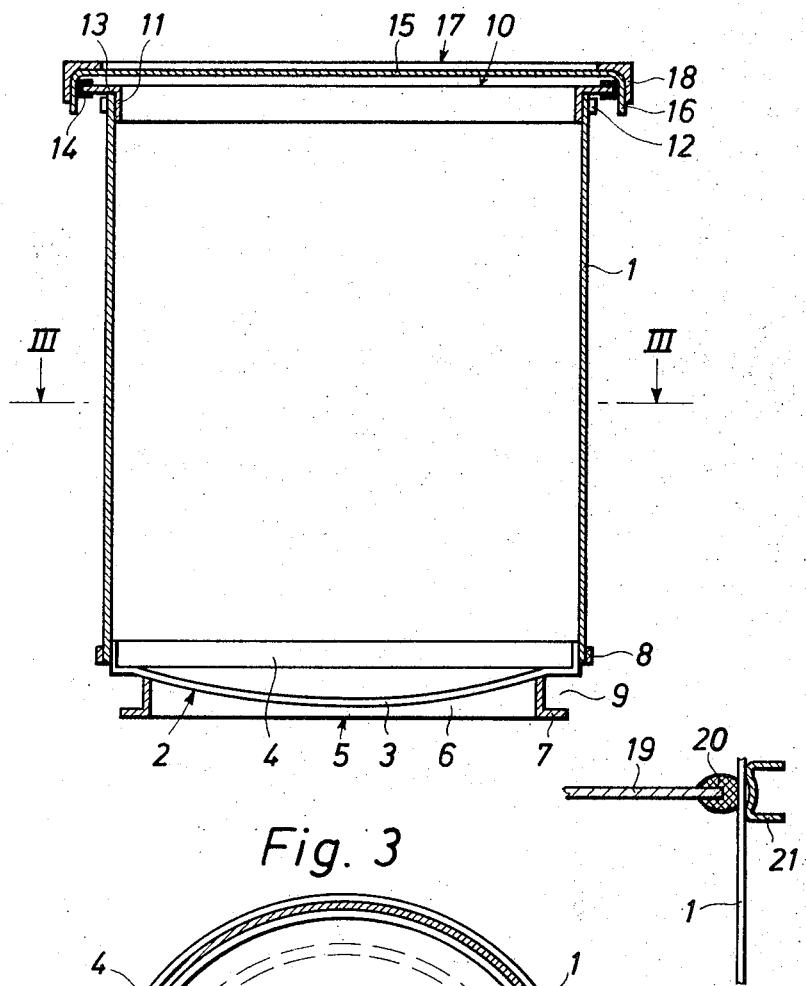
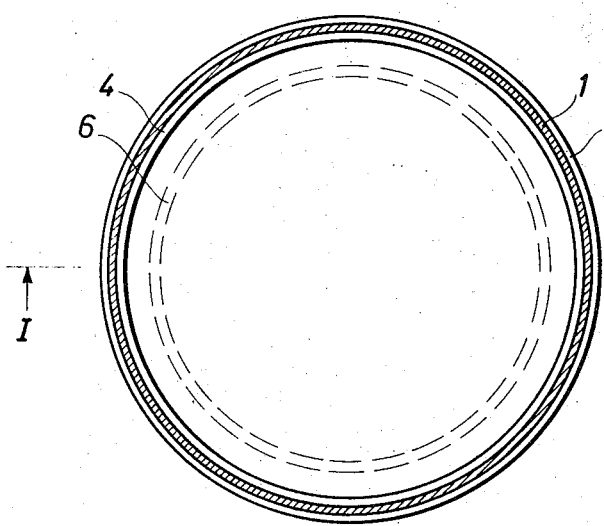

CONTAINER, ESPECIALLY FOR AGRICULTURAL PRODUCTS

The harvesters which are used in agriculture often have a very great capacity, so that it is difficult to have the crop taken away from the field. Therefore, it has been common to put the crop in large containers in the form of steel boxes, which can be transported on special vehicles. During the work of the harvester the crop is filled into the steel boxes arranged on the vehicle, and the boxes may thereafter be positioned on the field in order to be transported away later on. Such steel boxes are relatively expensive to manufacture, and they take up a great deal of room. Further, it is rather difficult to close such boxes air-tightly, which in many cases is necessary. If the material is moist and is to be stored for a long time, it is often necessary that the container is gas-tight, as the oxygen in the container thereby is transformed into carbon dioxide, which acts as a preservative and prevents decomposition of the material.

According to the invention a container is provided, especially adapted for agricultural products, such as corn, beets, potatoes or silage, consisting of a tube which is open in both ends and is manufactured of gas-tight material, such as a plastics material, and a rigid, gas-tight bottom end cover having a cylindrical portion which is surrounded by the lower rim of said tube, said tube being clamped against the cylindrical portion by means of an annular tension member, a foot portion being rigidly connected to the bottom end cover, said foot portion having a supporting surface and means for engagement by a preferably fork-shaped lifting member, the second end of the tube being gas-tightly closed by means of a top end cover, the upper rim of the tube being clamped between an annular tension member and the top end cover or a rigid portion which is gas-tightly connected to the cover member.

Such a container can be stowed away in a rather small space, especially if the tube is manufactured of plastics material. The container can be closed gas-tightly by means of simple tension bands which are easy to mount and detach. The container has a small weight in relation to the volume and can easily be transported by means of a fork-shaped lifting member, preferably on a fork lift truck.

In the following some preferred embodiments of the invention will be explained with reference to the drawing, where FIG. 1 shows a container according to the invention in cross-section along the line I—I in FIG. 3, FIG. 2 is a cross-section through a part of a container for a modified construction, and FIG. 3 a cross-section along the line III—III in FIG. 1.

The container consists of a tube 1 which is open in both ends and is manufactured of a suitable strong plastic foil having a wall thickness of e.g. 0.8 mm. The plastics material may be reinforced nylon. The tube 1 has a bottom end cover 2 which is so adapted that it constitutes a foot means for the container and a top end cover which is easily detachable.

The bottom end cover is constituted by a plate element 2 having a downwardly dome-shaped central portion 3 and a peripheral, upwardly extending flange 4. To the under side of the dome-shaped portion 3 a foot portion is welded. The foot portion 5 consists of a ring having a L-shaped cross-section the vertical flange 6 of which is welded to the portion 3, whereas the horizontal flange 7 constitutes a supporting surface for the container. The lower rim of the tube 1 surrounds the flange 4 and is clamped against said flange by means of an annular tension band 8 which may be of a conventional type, e.g., an easily detachable, resilient toggle closure.

According to FIG. 1 the flange 7 constitutes together with a portion of the plate element 2 a circumferential groove 9 which is adapted to receive a fork-shaped lifting member on a fork lift truck, so that the container can be lifted and arranged on a vehicle or taken from a vehicle or removed from one position to another.

By the embodiment according to FIG. 1 a rigid ring 10 is mounted in the upper portion of the tube 1. The ring 10 has a cross-section as an inverted L, and the vertical, downwardly extending flange 11 engages the inner surface of the upper rim portion of the tube. This rim portion is clamped against the flange 11 by means of a tension band 12 which may be of a conventional type having resilient closure. The horizontal flange 13 carries along its periphery an elastic sealing ring 14. A circular piece 15 of material, e.g. a plastic foil, provides a cover for the container and is positioned on the rigid ring 10. The rim portion 16 of the piece 15 is bent downwardly and surrounds the sealing ring. The rim portion 16 is clamped against the sealing ring 14 by a tension ring 17 having a cross-section as an inverted L, and its downwardly extending, vertical flange 18 presses against the rim portion 16 and the sealing ring 14. This tension ring is easily detachable and is used for opening and closing the container, and it is therefore provided with easily maneuverable tension means which are not shown in the drawing. The tension bands 8 and 12 need not be very easily detachable as is the case with the tension ring 17, as they are only to be detached by dismantling and stowing away of the container.

By the modification shown in FIG. 2 a cover 19 is provided which is a rigid plate which along the periphery carries a sealing ring 20 of resilient material. The upper rim portion of the tube 1 is pressed between the sealing ring 20 and an annular tension member 21 having easily maneuverable closing means which are not shown in the drawing.

By means of the described sealing and tension means there is by simple members provided a gas-tight container in which agricultural crops may be stored for longer periods and may be transported in a suitable manner.

I claim:

1. A container, especially for agricultural products, such as corn, beets, potatoes or silage, consisting of a tube which is open in both ends and is manufactured of gas-tight material, such as a plastics material, and a rigid, gas-tight bottom end cover having a cylindrical portion which is surrounded by the lower rim of said tube, said tube being clamped against the cylindrical portion by means of an annular tension member, a foot portion being rigidly connected to the bottom end cover, said foot portion having a supporting surface and means for engagement by a preferably fork-shaped lifting member, the second end of the tube being gas-tightly closed by means of a top end cover, the upper rim of the tube being clamped between an annular tension member and the top end cover or a rigid portion which is gas-tightly connected to the cover member.

2. A container according to claim 1, where the bottom end cover consists of a plate portion having a downwardly dome-shaped central portion and a peripheral, vertical flange the outer side of which constitutes a cylindrical surface for the rim portion of the tube, the foot portion consisting of a ring having an L-shaped cross-section, the vertical flange of said ring being rigidly connected to the bottom face of the said plate portion, whereas the horizontal flange extends outwardly and constitutes the supporting surface.

3. A container according to claim 1, where the top end cover is a rigid plate element the periphery of which engages the rim portion of the tube, which rim portion is clamped between the top end cover and the tension member, a sealing ring being preferably inserted between the parts.

4. A container according to claim 1, where the top end cover is a gas-tight piece of material, preferably a plastic foil, the rim portion of which is clamped between a tension member and a rigid ring, the rim portion of the tube being clamped between said ring and another tension ring, a sealing ring being preferably inserted between the parts.

5. A container according to claim 4, where the rigid ring has a cross-section as an inverted L, the vertical flange of the ring being surrounded by the rim portion of the tube, said rim portion being clamped against the flange of the tension ring, the horizontal, outwardly extending flange of the rigid ring having a sealing ring arranged along its edge, the rim portion of the top end cover being clamped against said sealing ring by means of the tension member.

* * * * *